US008041957B2

(12) United States Patent
Michaelis et al.

(10) Patent No.: US 8,041,957 B2
(45) Date of Patent: Oct. 18, 2011

(54) ASSOCIATING SOFTWARE WITH HARDWARE USING CRYPTOGRAPHY (75) Inventors: Oliver Michaelis, San Diego, CA (US); Anthony P. Mauro, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/815,256

(22) Filed: Mar. 31, 2004

(65) Prior Publication Data

US 2005/0005098 A1  Jan. 6, 2005

Related U.S. Application Data (60) Provisional application No. 60/461,341, filed on Apr. 8, 2003.

(51) Int. Cl.
*G06F 11/30* (2006.01)
(52) U.S. Cl. ............ 713/187; 713/188; 713/189
(58) Field of Classification Search ............ 713/200, 713/201, 187–189; 705/51
See application file for complete search history.

(56) References Cited

U.S. PATENT DOCUMENTS

| | | | |
|---|---|---|---|
| 4,658,093 A | | 4/1987 | Hellman |
| 5,398,285 A | * | 3/1995 | Borgelt et al. ............ 380/30 |
| 5,638,446 A | * | 6/1997 | Rubin ............ 705/51 |
| 6,243,468 B1 | * | 6/2001 | Pearce et al. ............ 380/255 |
| 6,510,236 B1 | | 1/2003 | Crane et al. |
| 6,711,684 B1 | | 3/2004 | Moroney et al. |
| 6,728,880 B1 | | 4/2004 | Sites |
| 6,931,545 B1 | * | 8/2005 | Ta et al. ............ 713/156 |
| 7,321,957 B2 | | 1/2008 | Khan et al. |
| 2002/0001384 A1 | | 1/2002 | Buer et al. |
| 2002/0136401 A1 | | 9/2002 | Hoffstein et al. |
| 2002/0150253 A1 | | 10/2002 | Brezak et al. |
| 2003/0225960 A1 | | 12/2003 | Guu et al. |
| 2005/0018472 A1 | | 1/2005 | Lim |
| 2005/0033959 A1 | | 2/2005 | Zheng et al. |

(Continued)

FOREIGN PATENT DOCUMENTS

EP  0809244  11/1997

(Continued)

OTHER PUBLICATIONS

Preston Gralla, How The Internet Works, Sep. 2001, Que, 6thb edition, pp. 303-307.*

(Continued)

*Primary Examiner* — Jacob Lipman
(74) *Attorney, Agent, or Firm* — Howard H. Seo; Won Tae Kim (57) ABSTRACT

Techniques for associating software with hardware using cryptography are described. The software is identified by a software identifier (ID), and the hardware is identified by a hardware ID. The software is hashed to obtain a code digest. A code signature is generated for the code digest, software ID, and hardware ID. A code image is formed with the software, software ID, code signature, and a certificate. The certificate contains cryptographic information used to authenticate the certificate and validate the code signature. The code image is loaded onto a device. The device validates the software to hardware association prior to executing the software. For the validation, the device authenticates the certificate with a certificate authority public key embedded within the device. The device also validates the code signature using the cryptographic information contained in the certificate, information in the code image, and the hardware ID embedded within the device.

20 Claims, 8 Drawing Sheets

U.S. PATENT DOCUMENTS

| | | |
|---|---|---|
| 2005/0091520 A1 | 4/2005 | Khan et al. |
| 2005/0138400 A1 | 6/2005 | Sheriff et al. |

FOREIGN PATENT DOCUMENTS

| | | |
|---|---|---|
| GB | 2404263 | 1/2005 |
| GB | 2405007 | 2/2005 |
| JP | 10083297 | 3/1998 |
| JP | 10301773 | 11/1998 |
| JP | 10311773 | 11/1998 |
| JP | 11345117 | 12/1999 |
| JP | 2001-216042 | 8/2001 |
| JP | 2001243062 | 9/2001 |
| JP | 200223876 | 1/2002 |
| JP | 2002312052 | 10/2002 |
| JP | 200384984 | 3/2003 |
| WO | 9608092 | 3/1996 |
| WO | 9915947 | 4/1999 |
| WO | WO0075759 A1 | 12/2000 |
| WO | WO0219598 | 3/2002 |
| WO | WO2004075525 A1 | 9/2004 |

OTHER PUBLICATIONS

*Message Authenticatio using Hash Functions-The HMAC Construction* Mihir et al; RSA Laboratories CryptoBytes, Vo. 2, No. 1, Spring 1996.

*Cryptographic Message Syntax Standard* RSA Laboratories Technicol Note, Version 1.5, Revised Nov. 1, 1993.

*HMAC: Keyed Hashing for Message Authentication* H. Krawczyk, et al. Network Working Group, Request for Comments: 2104; Category: Informational , Feb. 1997.

*Keying Hash Functions for Message Authentication* Bellare et al., Advances in Cryptology-Crypto 96, Proceedings, Lecture Notes in Cumputer Sciences vol. 1109, N. Koblitz ed. Springer-Verlag, Jun. 1996.

International Preliminary Report on Patent-PCT/USO4/010867, International Search Authority-IPEA/US-Mar. 6, 2006.

International Search Report-PCT/US04/010867, International Search Authority-ISA/US-Sep. 29, 2005.

Menezes, Oorschot, Vanstone: "Handbook of Applied Cryptograhy" CRC Series on Discrete Mathematics and Its Applications, 1997, pp. 555-556, 559-560, 39, XP002521729.

Supplementary European Search Report-EP04749901, Berlin Patent Office-Mar. 30, 2009.

Written Opinion-PCT/US04/010867, International Search Authority-ISA/US-Sep. 29, 2005.

Federal Information Processing Standard (FIPS) Pub 180-1, "Secure Hash Standard," Apr. 17, 1995.

Federal Information Processing Standard (FIPS) Pub 186, "Digital Signature Standard (DSS)," May 19, 1994.

Federal information Processing Standards (FIPS) Pub 198, "The Keyed-Hash Message Authentication Code (HMAC)" Mar. 6, 2002.

RFC 1321, "The MD5 Message-Digest Algorithm" Divest, Apr. 1992.

RFC 2459, "Internet X.509 Public Key Infrastructive Certificate and CFL Profile," Housley, et al., Jan. 1999.

Translation of Office Action in Japan application 2006-509824 Corresponding to U.S. Appl. No. 10/815,256, citing JP2001243062, JP200384984, JP10311773, JP11345117, JP2002312052, Nozawa__Basic__Knowledge_pp.__124__129__year__2000 and JP200223876 dated Mar. 22, 2011.

\* cited by examiner

ASSOCIATING SOFTWARE WITH HARDWARE USING CRYPTOGRAPHY

This application claims the benefit of provisional U.S. application Ser. No. 60/461,341, entitled "Associating Authenticated Software with a Licensed Hardware platform," filed Apr. 8, 2003.

BACKGROUND

I. Field

The present invention relates generally to electronics, and more specifically to techniques for associating software with hardware.

II. Background

Electronics devices are widely available for various applications such as wireless communication, personal computing, and so on. These devices can support more functions and/or more complicated functions as the hardware becomes more powerful. For example, a modern-day cellular phone can provide wireless communication and may further function as a gaming device, a personal digital assistant (PDA), a digital camera, and so on.

A complex electronics device (e.g., a cellular phone) typically requires software to control the hardware and to support various designed functions. The software may be loaded into a non-volatile memory within the device during manufacturing and/or downloaded to the device during activation. Regardless of how the software is loaded onto the device, it may be desirable or necessary to ascertain whether or not the loaded software is "suitable" for the hardware, where suitability may be quantified by various factors as described below. For example, it may be desirable to ascertain that the loaded software is a version that has been authorized by the manufacturer and to prevent execution of the software if it is an unauthorized version.

There is therefore a need in the art for techniques to associate software with hardware for an electronics device.

SUMMARY

Techniques for associating software with hardware using cryptography are described herein. The software is identified by a software identifier (ID), which may be a software release version number. The hardware is identified by a hardware ID, which may be a model number or a part number.

In one specific scheme for associating software with hardware, the software is first hashed to obtain a code digest. A code signature is then generated for the code digest, the software ID, and the hardware ID. A code image is next formed with the software, the software ID, the code signature, and a certificate. The certificate contains cryptographic information used to (1) authenticate a certificate authority that generated the code signature and (2) validate the code signature. The code image is provided to and stored by a device, e.g., a wireless device such as a cellular phone.

The device validates the software to hardware association prior to executing the software. The device may perform the validation each time it is powered on. For the validation, the device first authenticates the certificate with a public key for the certificate authority, which is embedded within the device. The device then validates the code signature using (1) the cryptographic information contained in the certificate, (2) information in the code image, and (3) the hardware ID embedded within the device. The validation may also be performed in a different order (e.g., validate the signature first, then authenticate the certificate).

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for associating software with hardware using cryptography may be used for various electronics devices such as a wireless device, a cellular phone, a handset, a computing device, a PDA, and so on. For clarity, these techniques are specifically described for a wireless device (e.g., a cellular phone).

The association of software with hardware is achieved using cryptographic techniques. In general, symmetric or asymmetric cryptography may be used for the association. For asymmetric cryptography (which is also known as public-key cryptography), a pair of keys composed of a private key and a public key is used for secure functions such as authentication, encryption, and decryption. The private key is kept in secrecy and the public key is provided as needed. Different secure functions may be achieved based on how the keys are used to process data. For symmetric cryptography (which is also known as secret key cryptography), both transacting entities know a secret key a priori and keep the key secret from other entities. Asymmetric cryptography is more suitable for applications in which one entity signs data and many entities authenticate the signature to validate the data. Thus, asymmetric cryptography is used for the following description.

Figure 1:
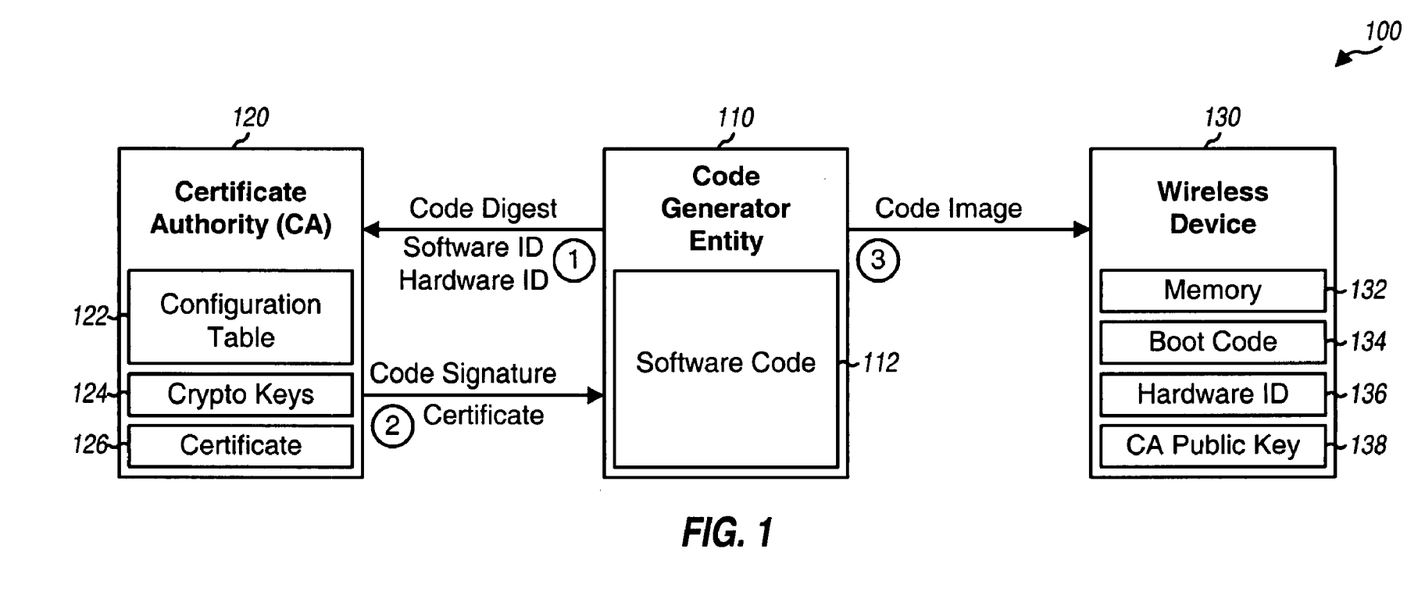
FIG. 1 shows a setup with various entities functioning to associate software with hardware.

FIG. 1 shows a setup 100 with various entities functioning to associate software with hardware. A code generator entity 110 generates software code 112 for a particular hardware platform (or simply, "hardware"). The software code is intended to be executed by the hardware to implement the desired functions. The software code is assigned a software identifier (ID), which may be a software release version number, a product key, or some other identification information. The hardware may be an integrated circuit, a chip set, a module, a device, and so on. The hardware is similarly assigned a hardware ID, which may be a model number, a product number, and so on. Each different hardware platform is assigned a different hardware ID, but all instances or units of the same hardware platform have the same hardware ID. Similarly, each software release is assigned a different software ID, but all instances or copies of the same software release have the same software ID. The software ID and hardware ID thus identify the software release and hardware platform, respectively, and not specific instances of the software and hardware.

Code generator entity 110 processes (e.g., hashes) the software code to obtain a code digest, which is a message digest resulting from the hashing. The hashing maps a potentially large and variable-sized file for the software code to a short fixed-size digest that can be more conveniently transferred and operated upon. Code generator entity 110 sends to a certificate authority (CA) 120 a request for a signature for the software code. The request includes (1) the code digest, (2) the software ID for the software code, and (3) the hardware ID for the hardware on which the software code is intended to run. The request may include equivalent information. For example, code generator entity 110 may send the software code instead of the code digest, some other information identifying the software code and the intended hardware, and so on.

Certificate authority 120 is a trusted entity that verifies whether or not the software can be associated with the hardware. Certificate authority 120 may first authenticate code generator entity 110 based on a certificate sent along with the request by code generator entity 110. This certificate is not shown in FIG. 1 for simplicity. The verification for the requested association may be achieved by matching the software ID and the hardware ID received from code generator entity 110 against information stored in a configuration table 122. For example, table 122 may store a list of software and hardware associations that is permitted for code generator entity 110. The requested association would be allowed if it matches one of the permitted associations stored in the table. Once the requested association has been verified, certificate authority 120 associates the software with the hardware using cryptography and crypto keys 124. Crypto keys 124 include two sets of keys: (1) a set of private and public keys used for signing and authenticating the software code (which are referred to herein as the "code" private and public keys) and (2) a set of private and public keys used for identifying and authenticating certificate authority 120 (which are referred to herein as the "CA" private and public keys). Certificate authority 120 generates a signature over the code digest, the software ID, and the hardware ID using the code private key. This signature is referred to herein as the "code signature". Certificate authority 120 then sends the code signature and a certificate 126 to code generator entity 110. The certificate contains (1) the code public key corresponding to the code private key used to generate the code signature, (2) a signature generated over the code public key using the CA private key (which is referred to herein as the "CA signature"), and (3) possibly other information.

Code generator entity 110 receives the code signature and the certificate from certificate authority 120 and forms a code image with the software code, the software ID, the code signature, and the certificate. Code generator entity 110 thereafter sends the code image to a wireless device 130, which stores the image in a non-volatile memory 132. Device 130 has a boot code 134 that executes, for example, each time the device is powered on. The boot code validates the software code for execution by device 130 based on (1) the software ID, the code signature, and the certificate included in the code image, (2) hardware ID 136, and (3) CA public key 138, as described below. The boot code, hardware ID, and CA public key are embedded within device 130 and are tamper resistant. Device 130 only executes the software code if it is validated by the boot code.

Code generator entity 110 may be the manufacturer of wireless device 130, a network operator or service provider for a wireless communication network in which wireless device 130 is used, a third party software vendor, an original equipment manufacturer (OEM), a licensee of an entity with intellectual property rights to the hardware and/or the technology used for the communication network, or some other entity. Certificate authority 120 may be an independent entity (e.g., Geotrust, Verisign, and so on) that is trusted to perform the association of software with hardware. Certificate authority 120 and code generator entity 110 may also be parts of the same entity (e.g., a network operator).

Figure 2:
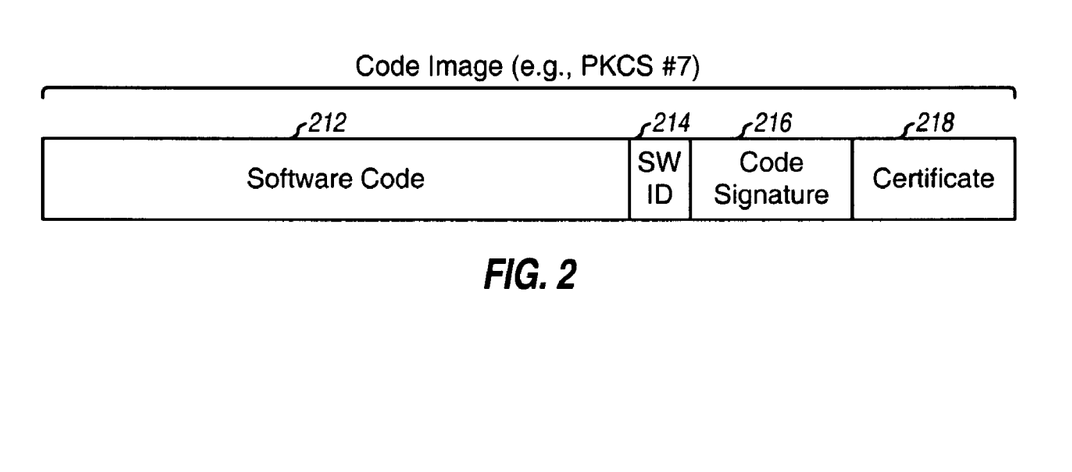
FIG. 2 illustrates a code image that is sent to and stored by a wireless device.

FIG. 2 illustrates the code image that is sent to and stored by wireless device 130. The code image contains a field 212 for the software code, a field 214 for the software ID (SW ID), a field 216 for the code signature generated by certificate authority 120, and a field 218 for the certificate provided by certificate authority 120. The code image may be stored in various formats such as, for example, a format defined by a document RFC 2315, entitled "PKCS #7: Cryptographic Message Syntax Version 1.5," which is publicly available. (PKCS stands for Public-Key Cryptography Standards.) The code image may also contain additional and/or different information than that shown in FIG. 2. For example, the software ID may be included within the software code and may not need to be stored separately as shown in FIG. 2.

Figure 3:
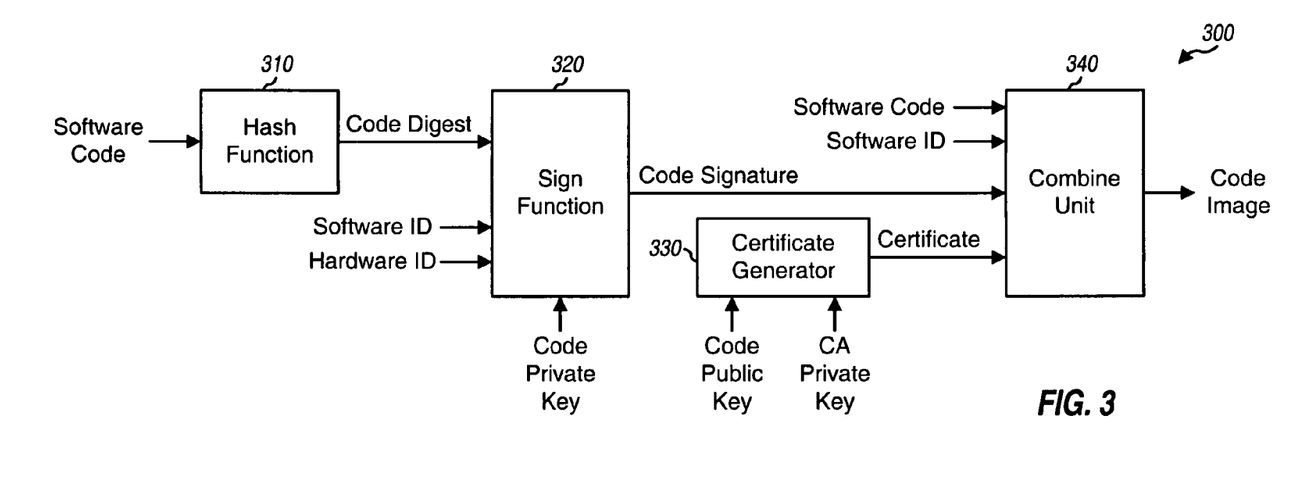
FIG. 3 shows the processing to generate the code image for the software.

FIG. 3 shows the processing to generate the code image for the software code. A hash function 310 receives and hashes the software code and provides the code digest. Since the software code may be a large file of many mega-bytes, the hashing generates a short fixed-size digest that can be more conveniently sent and operated upon. Hash function 310 maps the software code to the corresponding code digest. An important property of hash function 310 is to be collision resistance, which means that it should be infeasible to find two messages x and x' that map to the same digest. Hash function 310 may be implemented with various cryptographic hash functions such as SHA-1 (Secure Hash Algorithm), MD-5 (Message Digest), and other hash algorithms known in the art. SHA-1 provides a 160-bit message digest and is described in Federal Information Processing Standard (FIPS) PUB 180-1, entitled "Secure Hash Standard," which is publicly available. MD-5 provides a 128-bit message digest and is described in a document RFC 1321, entitled "The MD5 Message-Digest Algorithm," which is also publicly available.

A sign function 320 receives the code digest, the software ID, the hardware ID, and the code private key. Sign function 320 generates the code signature based on (and over) the code digest, software ID, and hardware ID using the code private key. Sign function 320 may be implemented as described below.

A certificate generator 330 receives the code public key corresponding to the code private key, the CA private key, and other pertinent information (e.g., information identifying the entity generating the certificate, the cryptographic algorithms used for the certificate, and so on). Certificate generator 330 generates a signature over the code public key and the other pertinent information with the CA private key. This signature is referred to herein as the "CA signature". Certificate generator 330 then forms the certificate with the code public key, the CA signature, and other information. The certificate may be stored in various formats such as, for example, a format defined by a document RFC 2459, entitled "Internet X.509 Public Key Infrastructure Certificate and CRL Profile," which is publicly available. The certificate is used to authenticate certificate authority 120 as well as the code public key, as described below.

A combine unit 340 receives and combines the software code, the software ID, the code signature, and the certificate to obtain the code image (e.g., in PKCS #7 format).

Hash function 310 and combine unit 340 may reside at code generator entity 110 in FIG. 1. Sign function 320 and certificate generator 330 may reside at certificate authority 120. Alternatively, hash function 310, sign function 320, certificate generator 330, and combine unit 340 may all reside within the same entity.

Figure 4:
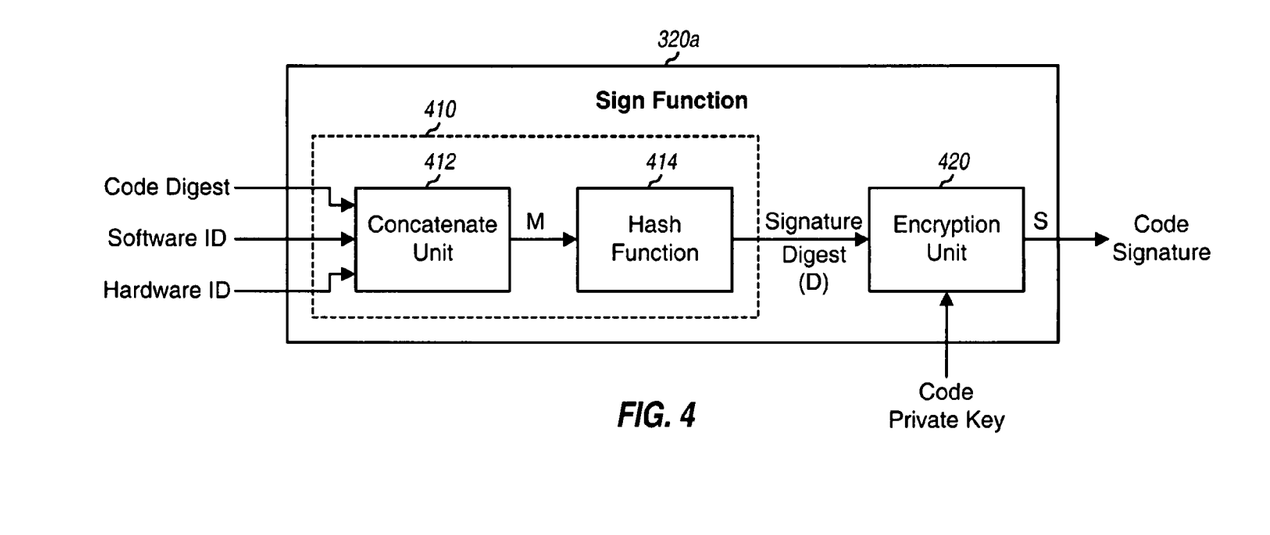
FIG. 4 shows a unit for generating a code signature.

FIG. 4 shows a processing unit 320*a* for generating the code signature. Processing unit 320*a* may be used for sign function 320 in FIG. 3.

Within unit 320*a*, a hash unit 410 performs concatenation and hashing of the code digest, the software ID, and the hardware ID. For the embodiment shown in FIG. 4, within hash unit 410, a concatenate unit 412 receives and concatenates the code digest, the software ID, and the hardware ID to obtain a message (M). A hash function 414 hashes the message (M) and provides a message digest (D). Digest (D) contains information associating the software with the hardware and is referred to herein as the "signature digest". An encryption unit 420 then encrypts the signature digest (D) with the code private key to generate the code signature (S).

Typically, the entire message used to generate the digest (D) is also sent along with the code signature (S). However, for this application, the three pieces of information used to obtain the code signature are available to the wireless device via other means. In particular, the wireless device can obtain the code digest and the software ID from the code image, and the hardware ID is embedded within the wireless device.

Unit 320*a* may implement the RSA (Rivest, Shamir, and Adleman) algorithm. For this implementation, hash function 414 may implement SHA-1, MD-5, or some other hash function, and encryption unit 420 encrypts the digest (D) with the code private key. Unit 320*a* may also implement the Digital Signature Standard (DSS) described in FIPS PUB 186, entitled "Digital Signature Standard (DSS)," which is publicly available. For this implementation, hash function 414 implements SHA-1, and encryption unit 420 implements the Digital Signature Algorithm (DSA). Processing unit 320*a* may also implement some other cryptographic (digital signature or encryption) algorithm, and this is within the scope of the invention.

Figure 5:
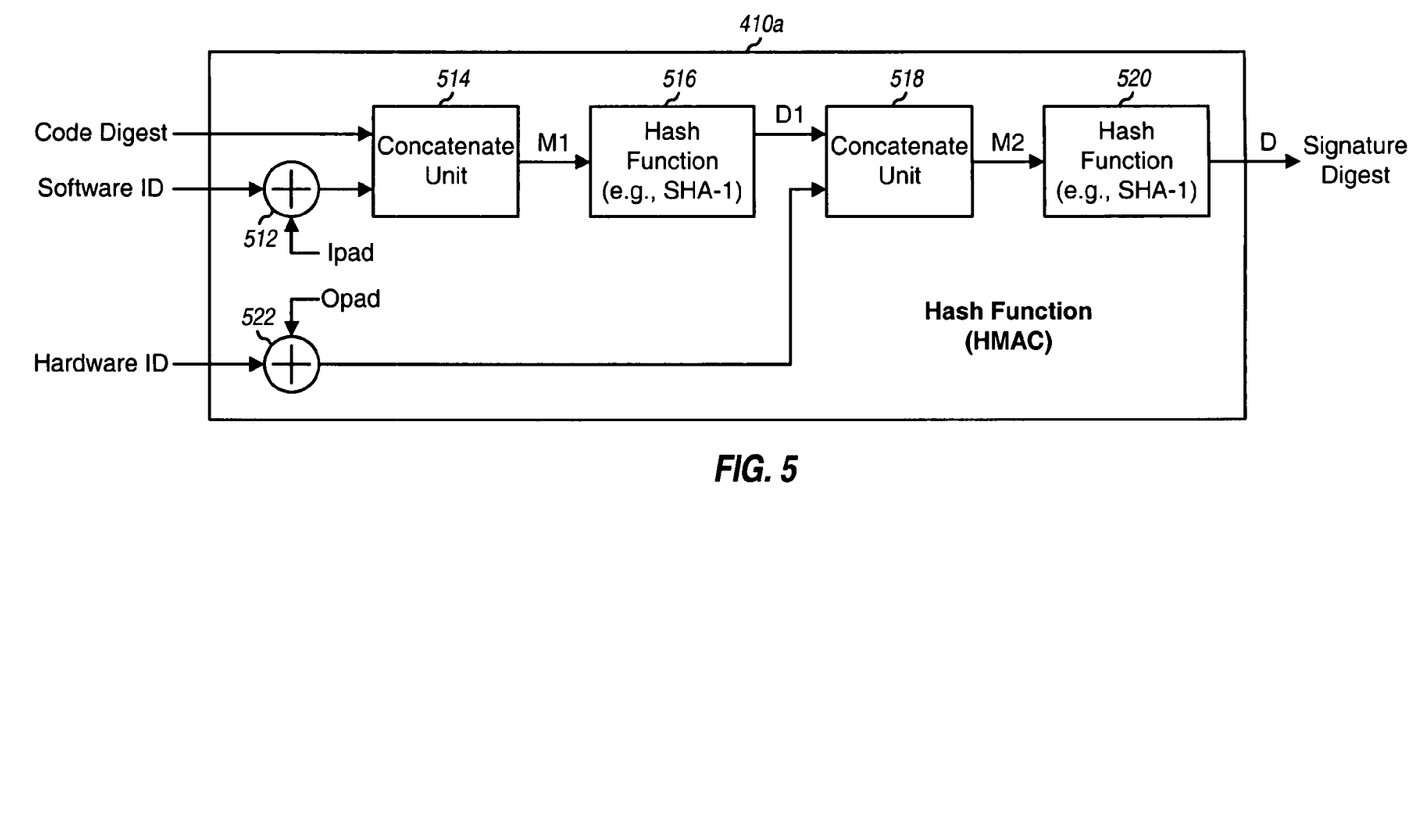
FIG. 5 shows a unit for generating a digest used for the code signature.

FIG. 5 shows a processing unit 410*a* for generating the signature digest (D) used for the code signature. Processing unit 410*a* may be used for hash unit 410 in FIG. 4. Unit 410*a* implements Hash-based Message Authentication Code (HMAC). HMAC is described in a document RFC 2104, entitled "HMAC: Keyed-Hashing for Message Authentication," and in a document FIPS PUB 198, entitled "The Keyed-Hash Message Authentication Code (HMAC)," both of which are publicly available.

Within processing unit 410*a*, a unit 512 receives the software ID and performs exclusive-OR of the software ID and an "ipad" value. This ipad value may be the one defined by RFC2401, which is a hexadecimal byte 0×36 repeated 64 times. However, the ipad value may be defined with some other base value instead of 0×36, and the base value may be repeated a different number of times instead of 64 times. The ipad value may also be defined as a single value without any repetition. Zero padding is performed on the software ID and hardware ID as necessary to obtain the desired length, which is not shown in FIG. 5 for simplicity. The exclusive-OR may be performed with a bit-wise modulo-2 add. A concatenate unit 514 receives and concatenates the code digest with the output of ex-OR unit 512 and provides a first message (M1). A hash function 516 receives and hashes the first message and provides a first digest (D1).

A unit 522 performs exclusive-OR of the hardware ID and an "opad" value. This opad value may be the one defined by RFC2401, which is a hexadecimal byte 0×5c repeated 64 times. However, the opad value may be defined with some other base value instead of 0×5c, and the base value may be repeated a different number of times instead of 64 times. The opad value may also be defined as a single value without any repetition. A concatenate unit 518 receives and concatenates the first digest (D1) from hash function 516 with the output of ex-OR unit 522 and provides a second message (M2). A hash function 520 receives and hashes the second message (M2) and provides a second digest, which is used as the signature digest (D). Hash functions 516 and 520 may be implemented with various cryptographic hash functions such as SHA-1, MD-5, or some other hash algorithm.

FIG. 5 shows the use of HMAC in a specific manner to generate the signature digest. The HMAC structure may also be used in other manners to generate the signature digest, and this is within the scope of the invention. For example, the software ID and hardware ID may be concatenated and then provided to unit 512 and exclusive-ORed with the ipad value, and the code digest may be provided to unit 522 and exclusive-ORed with the opad value.

FIGS. 4 and 5 show two exemplary schemes for generating the signature digest. Processing unit 410*a* in FIG. 5 uses the three items (i.e., code digest, software ID, and hardware ID) as keys to the HMAC to generate the signature digest. Unit 410 in FIG. 4 concatenates the three items into one message (M) and runs one hash over the message (M) to generate the signature digest. The signature digest may also be generated in other manners, and this is within the scope of the invention.

Figure 6:
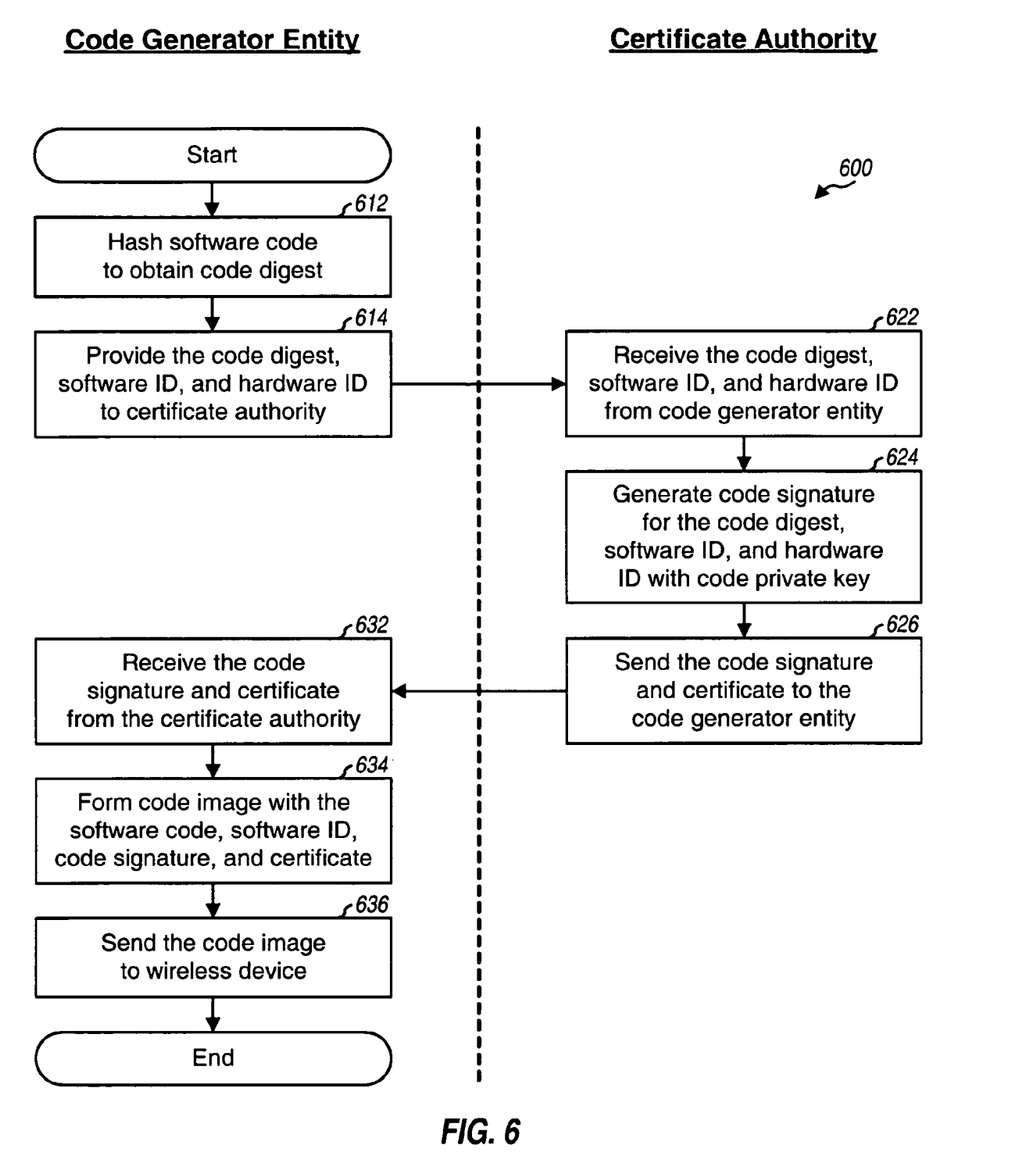
FIG. 6 shows a process for generating the code image for the software.

FIG. 6 shows a flow diagram of a process 600 for generating the code image for the software code. Process 600 is performed by code generator entity 110 and certificate authority 120.

Initially, code generator entity 110 hashes the software code to obtain the code digest (block 612). Code generator entity 110 then sends the code digest, software ID, and hardware ID in a request for a code signature (block 614), which are received by certificate authority 120 (block 622). Certificate authority 120 generates the code signature (if the signature is authorized) for the code digest, the software ID, and the hardware ID using the code private key (block 624). Certificate authority then returns the code signature and certificate (block 626), which are received by code generator entity 110 (block 632). Code generator entity 110 then forms the code image with the software code, software ID, code signature, and certificate, as shown in FIG. 2 (block 634). Code generator entity 110 may thereafter send the code image to wireless device 130 (block 636). The process then terminates.

Figure 7:
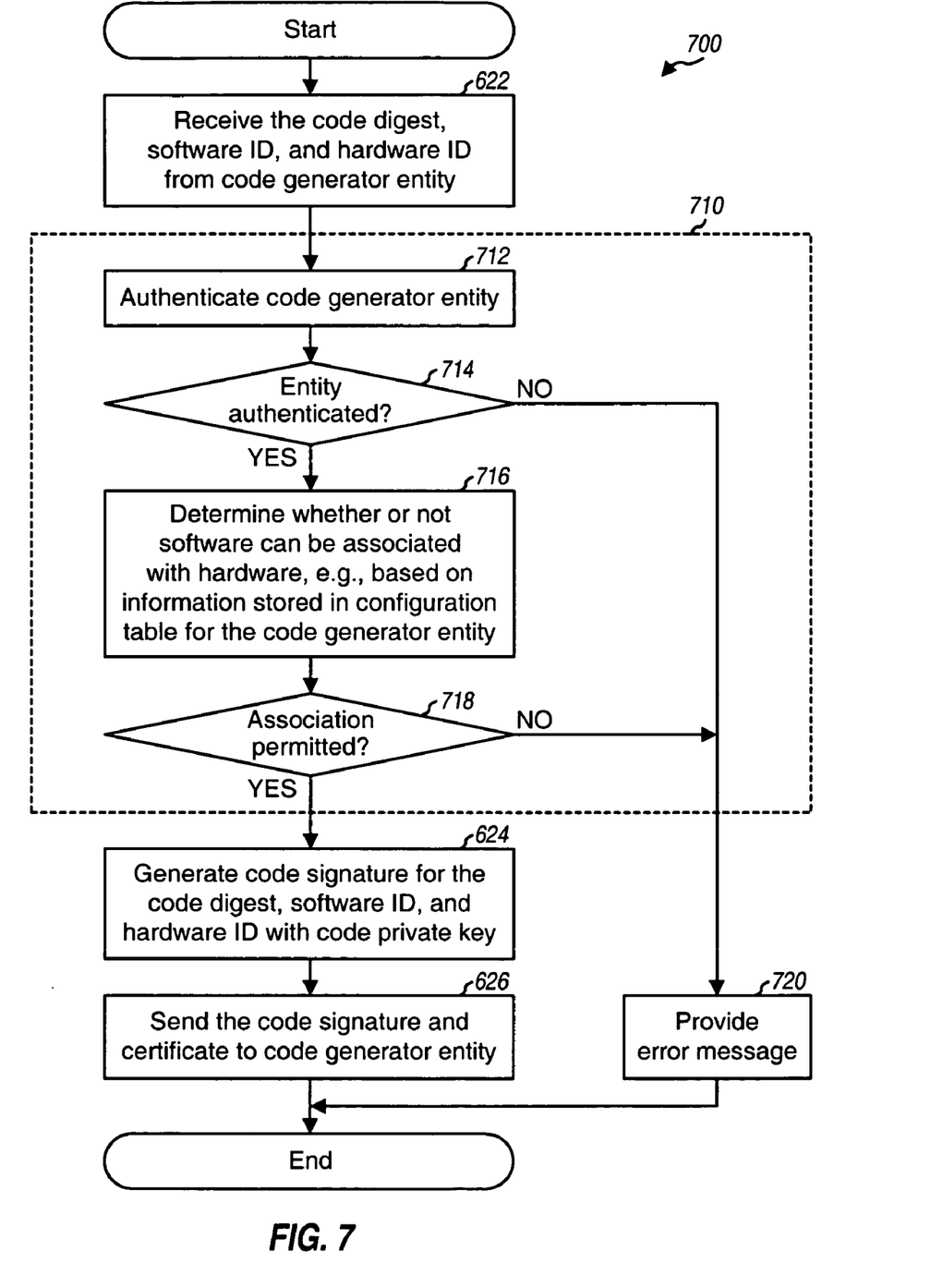
FIG. 7 shows a process for generating the code signature.

FIG. 7 shows a flow diagram of a process 700 for generating the code signature. Process 700 includes blocks 622, 624, and 626 in FIG. 6 and further includes a block 710 for authenticating code generator entity 110 and determining whether or not the software code can be associated with the hardware. Process 700 may be performed by certificate authority 120.

Certificate authority 120 receives a request for a code signature from code generator entity 110 (block 622). This request includes the code digest, software ID, hardware ID, and a certificate for code generator entity 110 (which is referred to herein as the "CG certificate"). Certificate authority 120 authenticates code generator entity 110 based on the CG certificate (block 712). If code generator entity 110 is not authenticated based on the CG certificate (i.e., the answer is 'no' for block 714), then an error message is sent back (block 720), and the process terminates.

If code generator entity 110 is authenticated (i.e., the answer is 'yes' for block 714), then a determination is made whether or not the software represented by the software digest and software ID can be associated with the hardware indicated by the hardware ID (block 716). This may be achieved based on the configuration table maintained by certificate authority 120, as described above. If the software to hardware association is not permitted (i.e., the answer is 'no' for block 718), then an error message is sent back (block 720), and the process terminates. Otherwise, certificate authority 120 generates the code signature, as requested, based on the code digest, software ID, and hardware ID (block 624). Certificate authority 120 then sends the code signature and certificate to code generator entity 110 (block 626). The process then terminates.

Figure 8:
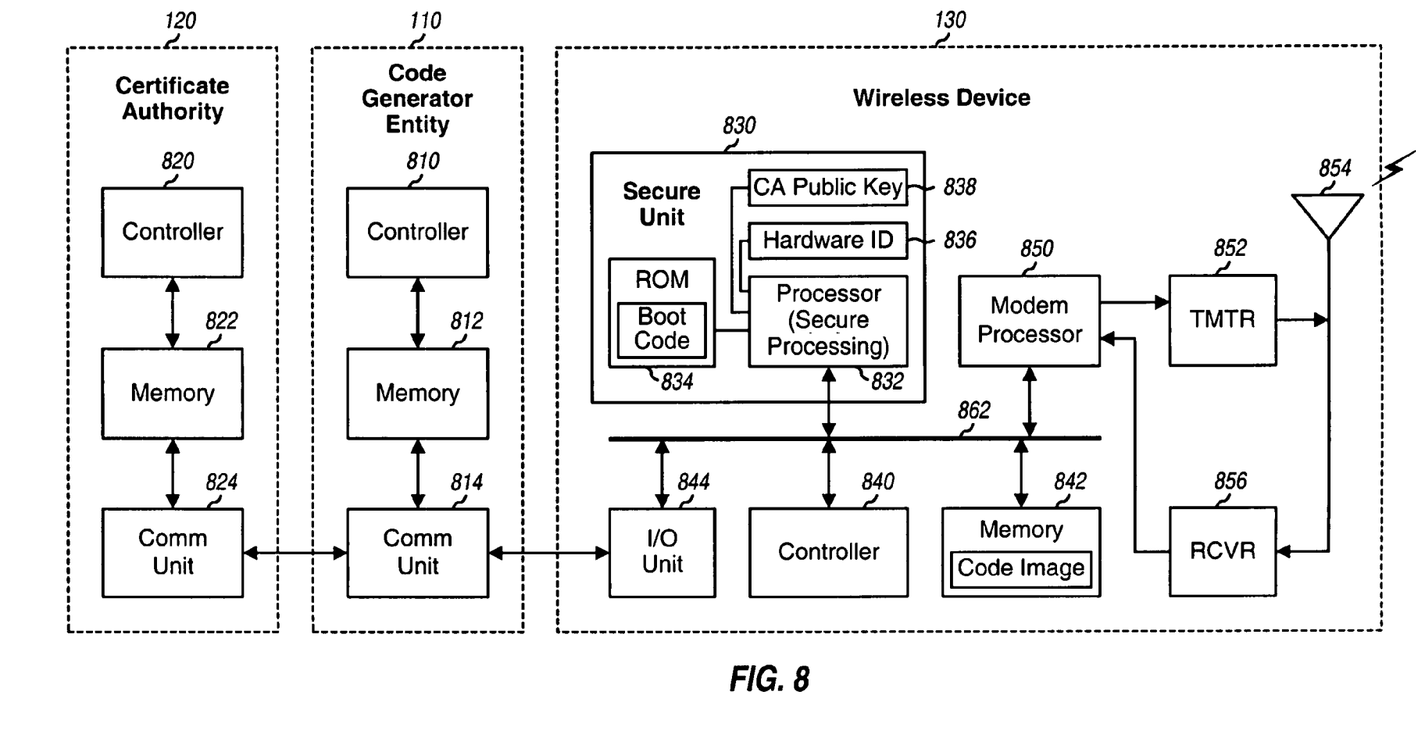
FIG. 8 shows a block diagram of a code generator entity, a certificate authority, and the wireless device.

FIG. 8 shows a block diagram of code generator entity 110, certificate authority 120, and wireless device 130. Code generator entity 110 includes a controller 810, a memory unit 812, and a communication (comm) unit 814. Controller 810 performs processing to generate the code digest and the code image. Memory unit 812 stores the software code as well as program code and data used by controller 810. Communication unit 814 provides communication with certificate authority 120 and wireless device 130.

Certificate authority 120 includes a controller 820, a memory unit 822, and a communication unit 824. Controller 820 performs processing to generate the code signature and certificate. Memory unit 822 stores configuration table 122, crypto keys 124, certificate 126, and program code and data used by controller 820. Communication unit 824 provides communication with code generator entity 110.

Device 130 may communicate with one or more wireless communication systems such as a Code Division Multiple Access (CDMA) system, a Global System for Mobile Communications (GSM) system, a Bluetooth system, a multiple-input multiple-output (MIMO) system, an orthogonal frequency division multiple access (OFDMA) system, and so on. A CDMA system may implement one or more CDMA standards such as IS-2000 (also known as "CDMA 1x-EV"), IS-856 (also known as "CDMA 1x-EVDO"), IS-95, Wideband-CDMA (W-CDMA), and so on. Device 130 is capable of providing bi-directional communication via a receive path and a transmit path.

For the transmit path, a modem processor 850 processes (e.g., encodes and modulates) data to be transmitted by device 130 and provides data chips to a transmitter unit (TMTR) 852. Transmitter unit 852 conditions (e.g., converts to analog, filters, amplifies, and frequency upconverts) the data chips and generates a modulated signal, which is transmitted via an antenna 854. For the receive path, signals transmitted by base stations in one or more systems are received by antenna 854 and provided to a receiver unit (RCVR) 856. Receiver unit 856 conditions (e.g., filters, amplifies, and frequency downconverts) the received signal, digitizes the conditioned signal, and provides data samples to modem processor 850 for demodulation and decoding.

A secure unit 830 performs secure processing and provides secure storage for device 130. For the embodiment shown in FIG. 8, secure unit 830 includes a processor 832 that performs secure processing and possibly other processing, a read only memory (ROM) 834 that stores the boot code, a unit 836 that stores the hardware ID for device 130, and a unit 838 that stores the public key for certificate authority 120. Units 836 and 838 may be implemented with ROMs, fuses, and so on. The boot code in ROM 834, the hardware ID in unit 836, and the CA public key in unit 838 correspond to boot code 134, hardware ID 136, and CA public key 138, respectively, in FIG. 1.

The boot code, hardware ID, and CA public key constitute secure data for device 130 and are stored in a secure manner (e.g., embedded) in one or more secure storage units within secure unit 830. This way, the secure data is safeguarded against security attacks and spoofing entities (e.g., hackers, viruses, and so on) that may attempt to infiltrate secure unit 830 in order to tamper with the secure data. Secure unit 830 may be implemented within a single integrated circuit (IC). Secure unit 830 may also be implemented as a secure and/or tamper resistance unit or module.

Secure unit 830 may be part of an application specific integrated circuit (ASIC) that performs various functions for wireless device 130. For example, the ASIC may include secure unit 830, modem processor 850, and so on. Processor 832 performs secure processing to validate the software code at boot-up. Processor 832 may also perform other functions during normal operation. Thus, processor 832 need not be a dedicated unit that only performs secure processing. For example, processor 832 may itself be the hardware that executes all or portions of the software code and with which the software code is associated.

A controller 840 performs various functions and coordinates and controls the operation of various processing units within device 130. For example, controller 840 may direct modem processor 850 to process data for the transmit and receive paths. A memory unit 842 stores program code and data used by various processing units within device 130. For example, memory unit 842 may store the code image with the software code, software ID, code signature, and certificate. An input/output (I/O) unit 844 provides an interface to external units. For example, I/O unit 844 may provide a mechanism (e.g., a port such as Universal Serial Bus (USB)) for loading the code image to device 130. A bus 862 interconnects various units within device 130.

Device 130 validates the software code within the code image each time the device is powered to ensure that the software code is a valid version. Processor 832 performs the validation based on the boot code stored in ROM 834 and using the hardware ID and CA public key embedded within secure unit 830, as described below. This allows processor 832 to establish trust within wireless device 130 from a known state, which is defined by the boot code, hardware ID, and CA public key. Processor 832 authorizes execution of the software code only after the software has been validated.

Figure 9:
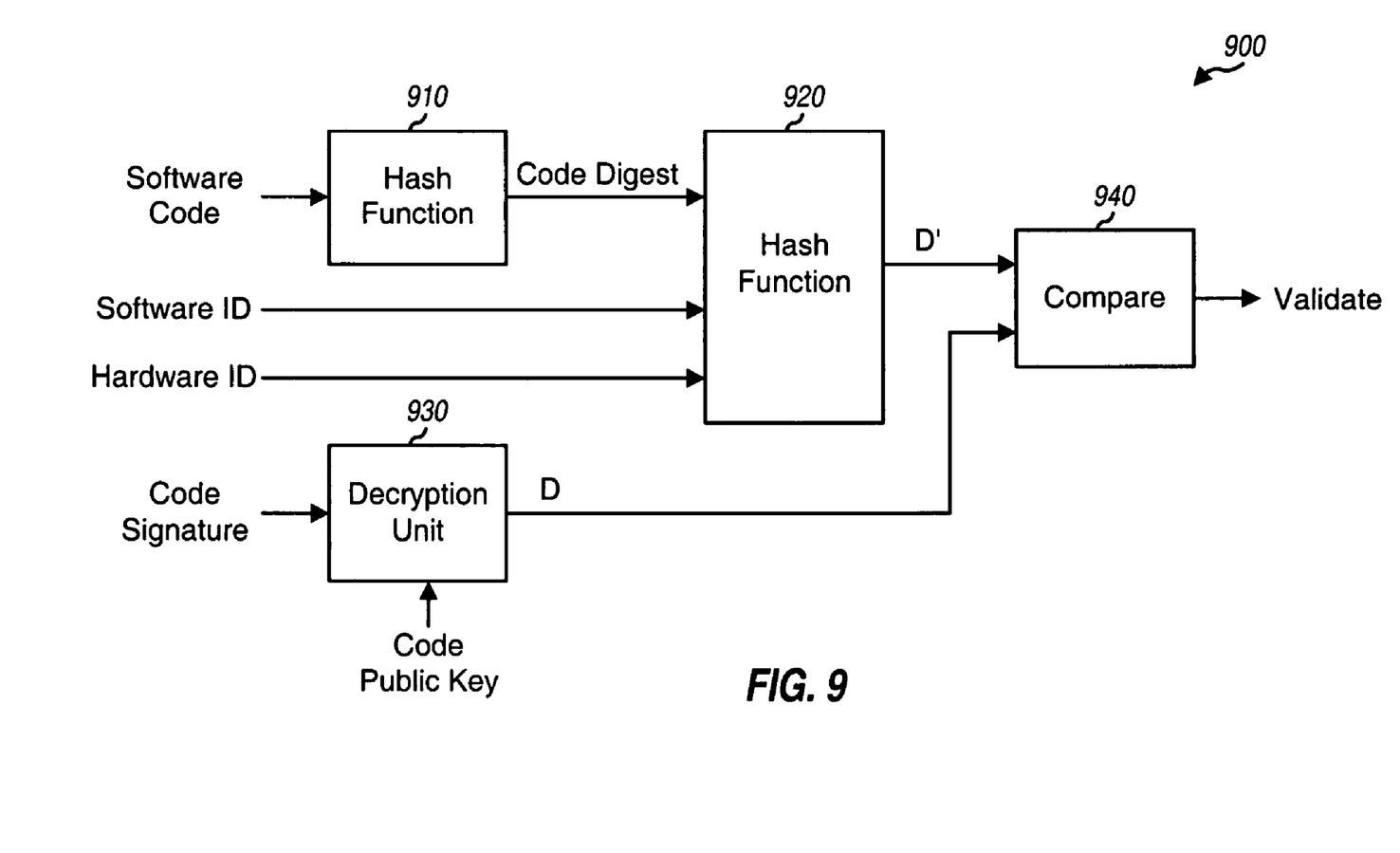
FIG. 9 shows a unit for validating the software based on the code signature.

FIG. 9 shows a processing unit 900 for validating the software code within the code image based on the code signature. Processing unit 900 may be implemented by processor 832 in FIG. 8. Within unit 900, a hash function 910 receives and hashes the software code from the code image and provides the code digest. Hash function 910 implements the same hash algorithm used for hash function 310 in FIG. 3. A hash function 920 receives and hashes the code digest from hash function 910, the software ID from the code image, and the hardware ID from secure unit 830 and provides a "regenerated" signature digest (D'). Hash function 920 implements the same hash algorithm used for hash unit 410 in FIG. 4.

A decryption unit 930 receives and decrypts the code signature from the code image with the code public key from the certificate and provides the "received" signature digest (D). A compare unit 940 then compares the regenerated signature digest (D') against the received signature digest (D) and provides a validate flag, which is set to 'true' if the two digests match and to 'false' otherwise.

Figure 10:
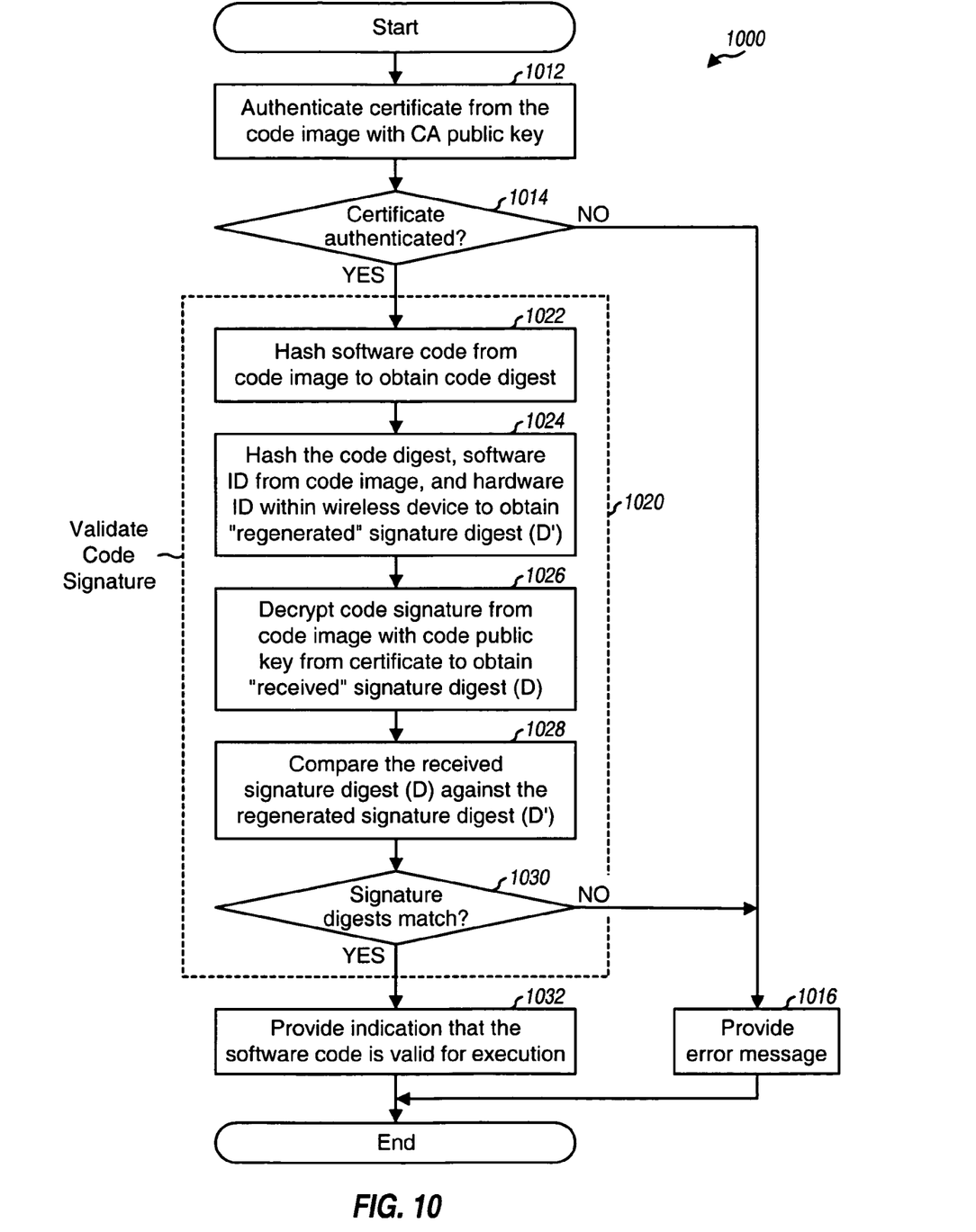
FIG. 10 shows a process for validating the software by the wireless device.

FIG. 10 shows a flow diagram of a process 1000 for validating the software code within the code image by wireless device 130. Process 1000 may be performed by processor 832 based on the boot code and is also referred to as a boot-up process.

Initially, the certificate is obtained from the code image and validated using the CA public key that is stored within device 130 (block 1012). The certificate contains the CA signature that was generated with the CA private key of certificate authority 120. This CA signature can be authenticated using the corresponding CA public key that is embedded within secure unit 830. A determination is then made whether or not the CA signature is validated (block 1014). If the answer is 'no', then an error message is generated (block 1016), and the boot-up process terminates.

If the CA signature is validated, then the code signature is validated in block 1020. For the code signature validation, the software code is obtained from the code image and hashed using the same hash function 310 used by code generator entity 110 to obtain the code digest (block 1022). The software ID is obtained from the code image and the hardware ID is obtained from secure unit 830. The code digest from block 1022, the software ID, and the hardware ID are then hashed using the same hash function 410 used by certificate authority 120 to obtain the regenerated signature digest (D') (block 1024).

The code public key is obtained from the certificate and the code signature is obtained from the code image. Since the CA signature is generated over the code public key, the code public key is authenticated if the CA signature is authenticated by the CA public key. The code signature is then decrypted with the code public key to obtain the received signature digest (D), which was used by certificate authority 120 to generate the code signature (block 1026). The received signature digest (D) is then compared against the regenerated signature digest (D') (block 1028).

A determination is next made whether or not the received signature digest matches the regenerated signature digest (block 1030). If the answer is 'no', then an error message is generated (block 1016), and the boot-up process terminates. Otherwise, the software code is indicated as being validated and can be executed (block 1032), and the boot-up process terminates.

The techniques described herein for associating software with hardware may be used for various applications. Some exemplary applications are described below.

One application is for downloading software to a wireless device via an unsecured link. It may be desirable to update the software for the wireless device, for example, to fix bugs, provide new features and functionalities, and so on. The techniques described herein may be used to send new versions of the software via an unsecured communication link (e.g., a wireless link) to the wireless device. The wireless device can validate the received software as originating from a legitimate source and being unmodified using cryptographic techniques, as described above. The wireless device would only execute the software after it has been validated.

Another application is for enforcing authorized (e.g., licensed) use of different hardware platforms. A first entity may have various hardware platforms, with each platform being assigned a different hardware ID. The first entity may grant a second entity licenses for some hardware platforms and no licenses for some other hardware platforms. The licensing information may be stored in the configuration table maintained by certificate authority 120. Whenever the second entity requests a code signature for a particular software and a particular hardware platform, certificate authority 120 would generate the code signature only if the second entity is licensed for the requested hardware platform. This way, a licensee cannot take out a license for a base hardware platform and then try to install and use software on a more elaborate hardware platform.

Yet another application is for enforcing authorized (e.g., licensed) use of a given hardware platform. The hardware for the wireless device may be designed with capability to perform a broad set of functions. These functions may be selectively enabled or disabled by software. Different licenses may be granted for different sets of functions. Each of these sets of functions may be associated with a different software version. The certificate authority may maintain a list of licensees, their specific licenses, and the permitted software version(s) for each licensee. The certificate authority would then generate signatures only for the software code version(s) that have been licensed. In this way, a licensee cannot take out a license for a basic set of functions and then try to install and use software for a more elaborate set of functions.

The techniques described herein for associating software with hardware may be implemented by various means at various entities. For example, these techniques may be implemented with hardware, firmware, software, or a combination thereof. For a hardware implementation, the processing units used to achieve the software with hardware association (at code generator entity 110 and certificate authority 120) and to validate the association (at device 130) may be implemented within application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory units 812, 822, and 842 in FIG. 8) and executed by processors (e.g., controllers 810, 820, and 840 and processor 832). The memory units may be implemented within the processors or external to the processors, in which case they can be communicatively coupled to the processors via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of validating an association of software code with hardware, comprising:
obtaining a certificate from a code image, wherein:
the code image further including software code, a code signature, and a first identifier associated with a release of the software code, all instances of the software code associated with the software release have the same first identifier such that at least two instances of the software code have the same first identifier, the code signature is generated, using cryptography and a code private key, based on the first identifier, a second identifier for the hardware, and a message code digest obtained by hashing the software code, the code signature is used to validate an association of the software code with the hardware, the certificate includes a code public key corresponding to the code private key, and an authority signature generated over the code public key using cryptography and an authority private key;

authenticating the certificate with an authority public key securely stored in the hardware;

obtaining the first identifier from the code image;

obtaining the second identifier for the hardware, wherein all instances of a particular configuration of the hardware have the same second identifier such that at least two instances of the hardware have the same second identifier;

obtaining the software code from the code image and generating an image code digest by hashing the software code from the code image;

generating a regenerated signature digest by hashing the image code digest, the first identifier, and the second identifier; and obtaining the code signature from the code image and generating a received signature digest by decrypting the code signature from the code image using the code public key; and comparing the regenerated signature digest with the received signature digest, wherein the association of the software code with the hardware is validated if the regenerated signature digest matches the received signature digest.

2. The method of claim 1, wherein the software code is executed by the hardware only if the association is validated.

3. The method of claim 1, wherein the regenerated signature digest is generated using a cryptography scheme that includes Hash-based Message Authentication Code (HMAC).

4. The method of claim 1, wherein the first identifier is a software release version number.

5. The method of claim 1, wherein the hardware is an integrated circuit of a specific design.

6. The method of claim 1, wherein the second identifier is a hardware part number.

7. The method of claim 1, wherein the authority public key is embedded in the hardware in a tamper-proof manner.

8. An apparatus having validation of an association of software with the apparatus hardware, comprising:

a first storage unit configured to securely store an authority public key; and a processor operative to obtain a certificate from a code image, wherein:

the code image further including software code, a code signature, and a first identifier associated with a release of the software code, all instances of the software code associated with the software release have the same first identifier such that at least two instances of the software code have the same first identifier, the code signature is generated, using cryptography and a code private key, based on the first identifier, a second identifier for the hardware, and a message code digest obtained by hashing the software code, the code signature is used to validate an association of the software code with the hardware, the certificate includes a code public key corresponding to the code private key, and an authority signature generated over the code public key using cryptography and an authority private key;

authenticate the certificate with the authority public key;

obtain the first identifier from the code image;

obtain the second identifier for the hardware, wherein all instances of a particular configuration of the hardware have the same second identifier such that at least two instances of the hardware have the same second identifier;

obtain the software code from the code image and generate an image code digest by hashing the software code from the code image;

generate a regenerated signature digest by hashing the image code digest, the first identifier, and the second identifier; and obtain the code signature from the code image and generate a received signature digest by decrypting the code signature from the code image using the code public key; and compare the regenerated signature digest with the received signature digest, wherein the association of the software code with the hardware is validated if the regenerated signature digest matches the received signature digest.

9. The apparatus of claim 8, wherein the authority public key is embedded in the hardware in a tamper-proof manner.

10. The apparatus of claim 8 and implemented within a wireless communication device.

11. The apparatus of claim 8, further comprising:

a second storage unit configured to store boot code executed by the processor to authenticate the certificate and to compare the regenerated signature digest with the received signature digest.

12. The apparatus of claim 11, wherein the first and second storage units and the processor are implemented within an integrated circuit.

13. An apparatus having validation of an association of software code with hardware, comprising:

means for obtaining a certificate from a code image, wherein:

the code image further including software code, a code signature, and a first identifier associated with a release of the software code, all instances of the software code associated with the software release have the same first identifier such that at least two instances of the software code have the same first identifier, the code signature is generated, using cryptography and a code private key, based on the first identifier, a second identifier for the hardware, and a message code digest obtained by hashing the software code, the code signature is used to validate an association of the software code with the hardware, the certificate includes a code public key corresponding to the code private key, and an authority signature generated over the code public key using cryptography and an authority private key;

means for authenticating the certificate with an authority public key securely stored in the hardware;

means for obtaining the first identifier from the code image;

means for obtaining the second identifier for the hardware, wherein all instances of a particular configuration of the hardware have the same second identifier such that at least two instances of the hardware have the same second identifier;

means for obtaining the software code from the code image and generating an image code digest by hashing the software code from the code image;

means for generating a regenerated signature digest by hashing the image code digest, the first identifier, and the second identifier;

means for obtaining the code signature from the code image and generating a received signature digest by decrypting the code signature from the code image using the code public key; and means for comparing the regenerated signature digest with the received signature digest, wherein the association of the software code with the hardware is validated if the regenerated signature digest matches the received signature digest.

14. The apparatus of claim 13, wherein the authority public key is embedded in the hardware in a tamper-proof manner.

15. An apparatus operable to validate software for hardware, comprising:
   a storage device configured to store a code image including the software, a code signature, and a certificate;
   a secure storage device configured to store a hardware identifier and a certificate authority public key;
   a processor configured to access the storage device and operative to:
      authenticate the certificate with the certificate authority public key,
      obtain a regenerated signature digest based on the software, a first identifier for the software, and the hardware identifier,
      decrypt the certificate using the certificate authority public key to recover a code public key,
      decrypt the code signature using the code public key to recover a received signature digest, and
      compare the regenerated signature digest with the received signature digest to validate the association of the software with the hardware.

16. The apparatus of claim 15, wherein the hardware identifier and the certificate authority public key are embedded in the apparatus in a tamper-proof manner.

17. A processor associated product, comprising:
   computer readable medium, storing:
      software code for causing a processor to obtain a certificate from a code image, wherein:
         the code image further including software code, a code signature, and a first identifier associated with a release of the software code,
         all instances of the software code associated with the software release have the same first identifier such that at least two instances of the software code have the same first identifier,
         the code signature is generated, using cryptography and a code private key, based on the first identifier, a second identifier for the hardware, and a message code digest obtained by hashing the software code,
         the code signature is used to validate an association of the software code with the hardware,
         the certificate includes a code public key corresponding to the code private key, and an authority signature generated over the code public key using cryptography and an authority private key;
      software code for causing a processor to authenticate the certificate with an authority public key securely stored in the hardware;
      software code for causing a processor to obtain the first identifier from the code image;
      software code for causing a processor to obtain the second identifier for the hardware, wherein all instances of a particular configuration of the hardware have the same second identifier such that at least two instances of the hardware have the same second identifier;
      software cede for causing a processor to obtain the software code from the code image and generate an image code digest by hashing the software code from the code image;
      software code for causing a processor to generate a regenerated signature digest by hashing the image code digest, the first identifier, and the second identifier; and
      software code for causing a processor to obtain the code signature from the code image and generate a received signature digest by decrypting the code signature from the code image using the code public key; and
      software code for causing a processor to compare the regenerated signature digest with the received signature digest, wherein the association of the software code with the hardware is validated if the regenerated signature digest matches the received signature digest.

18. The processor associated product of claim 17, wherein the authority public key is embedded in the hardware in a tamper-proof manner.

19. A method of validating software for hardware, comprising:
   storing a code image including the software, a code signature, and a certificate;
   storing a hardware identifier and a certificate authority public key;
   authenticating the certificate with the certificate authority public key,
   obtaining a regenerated signature digest based on the software, a first identifier for the software, and the hardware identifier,
   decrypting the certificate using the certificate authority public key to recover a code public key,
   decrypting the code signature using the code public key to recover a received signature digest, and
   comparing the regenerated signature digest with the received signature digest to validate the association of the software with the hardware.

20. The method of claim 19, wherein the hardware identifier and the certificate authority public key are embedded in the hardware in a tamper-proof manner.

* * * * *